(12) United States Patent
Pujar et al.

(10) Patent No.: US 9,771,866 B2
(45) Date of Patent: Sep. 26, 2017

(54) HIGH TEMPERATURE COMPOSITE INLET

(71) Applicant: ROHR, Inc., Chula Vista, CA (US)

(72) Inventors: Vijay V. Pujar, San Diego, CA (US); Teresa Kruckenberg, La Mesa, CA (US)

(73) Assignee: ROHR, INC., Chula Vista, CA (US)

( * ) Notice: Subject to any disclaimer, the term of this patent is extended or adjusted under 35 U.S.C. 154(b) by 430 days.

(21) Appl. No.: 14/609,254

(22) Filed: Jan. 29, 2015

(65) Prior Publication Data

US 2016/0305321 A1    Oct. 20, 2016

(51) Int. Cl.
| | |
|---|---|
| *B64D 29/00* | (2006.01) |
| *F02C 7/047* | (2006.01) |
| *B64D 15/12* | (2006.01) |
| *B64B 1/40* | (2006.01) |
| *B64F 1/04* | (2006.01) |
| *B64D 33/02* | (2006.01) |

(52) U.S. Cl.
CPC .............. *F02C 7/047* (2013.01); *B64B 1/40* (2013.01); *B64D 15/12* (2013.01); *B64D 29/00* (2013.01); *B64F 1/04* (2013.01); *B64D 2033/0233* (2013.01); *F05D 2300/434* (2013.01); *F05D 2300/5024* (2013.01); *F05D 2300/603* (2013.01); *F05D 2300/6033* (2013.01); *F05D 2300/611* (2013.01)

(58) Field of Classification Search
CPC .......... F02C 7/047; B64D 15/12; B64D 29/00
See application file for complete search history.

(56) References Cited

U.S. PATENT DOCUMENTS

| | | | | |
|---|---|---|---|---|
| 2008/0166563 A1* | 7/2008 | Brittingham | ............... | C08J 3/18 428/411.1 |
| 2011/0024409 A1* | 2/2011 | Shah | ...................... | B64D 15/12 219/482 |

* cited by examiner

*Primary Examiner* — Justin Benedik
(74) *Attorney, Agent, or Firm* — Snell & Wilmer, L.L.P.

(57) ABSTRACT

An inlet for an aircraft nacelle may comprise a nanoreinforced polyimide composite lip skin. The nanomaterials may increase thermal conductivity and decrease microcracking in the lip skin. A lip skin for an inlet with an electric heater may comprise a surface layer, an outer composite skin, an electric heater, an inner composite skin, and a thermal barrier coating. A lip skin for an inlet with a pneumatic deicing system may comprise a surface layer, a composite skin, and a thermal barrier coating.

10 Claims, 4 Drawing Sheets

HIGH TEMPERATURE COMPOSITE INLET

FIELD

The present disclosure relates to composite materials, and more particularly, to high temperature composite materials in aircraft nacelles.

BACKGROUND

Composite materials have various advantageous properties over conventional metal materials. In particular, composite materials may be lighter than metals such as aluminum. However, some composite matrix materials do not perform well at high sustained temperatures. For example, epoxy-based thermoset resin composites are typically not suitable for environments with sustained temperatures over 250° F. (120° C.).

Inlets for aircraft nacelles may be subject to ice build-up during flight. An electric or pneumatic heater may heat the inlet to prevent the ice build-up. However, conventional composite materials may not perform well at temperatures sufficiently high to prevent ice build-up.

SUMMARY

An inlet for an aircraft nacelle may comprise a first polyimide composite skin, a surface coating, and a thermal barrier coating. The first polyimide composite skin may comprise nanomaterials. The surface coating may be coated on the first polyimide composite skin.

In various embodiments, the inlet may comprise an electric heater. The inlet may comprise a second polyimide composite skin. The electric heater may be located between the first polyimide composite skin and the second polyimide composite skin. The nanomaterials may increase a thermal conductivity of the first polyimide composite skin. The nanomaterials may comprise grown on carbon fibers in the first polyimide composite skin. The first polyimide composite skin may comprise a nanoreinforced polyimide film. The nanomaterials may be distributed in a polyimide resin matrix in the first polyimide composite skin.

A nacelle may comprise a composite inlet. The composite inlet may comprise a polyimide composite skin and a surface coating. The polyimide composite skin may comprise nanomaterials configured to increase a thermal conductivity of the polyimide composite skin. The surface coating may be coupled to the polyimide composite skin.

In various embodiments, the nacelle may comprise a thermal barrier coating coupled to the polyimide composite skin. An electric heater may be located within the polyimide composite skin. The nanomaterials may be grown on carbon fibers in the polyimide composite skin. The nanomaterials may be dispersed in a polyimide resin matrix in the polyimide composite skin. The nanomaterials may lower a coefficient of thermal expansion of a polyimide resin matrix in the polyimide composite skin. The nacelle may comprise a nanoreinforced polyimide film.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

An inlet for a nacelle may comprise a nanoreinforced polyimide composite skin. Polyimide is generally capable of withstanding higher temperatures than other composite matrix materials, such as epoxy. However, the difference in the coefficient of thermal expansion ("CTE") between polyimide and carbon fibers can result in microcracking of the polyimide resin matrix. Additionally, the polyimide resin matrix may be subjected to oxidation over many thermal cycles. Oxidation can result in the polyimide resin matrix becoming more brittle and subject to microcracking.

Nanomaterials may be grown on carbon fibers or distributed in a polyimide resin. The nanomaterials may have a CTE between the CTE of the polyimide resin and the CTE of carbon fibers. Thus, the nanomaterials may decrease the average CTE of the polyimide resin matrix and decrease the mismatch between the polyimide resin and the carbon fibers, which may prevent microcracking of the polyimide resin. Additionally, the nanomaterials may increase the thermal conductivity of the polyimide composite skin, which may allow an electric heater to be placed further from the outer surface of the inlet and be protected from external damage, and the electric heater may be operated at lower temperatures.

Figure 1:
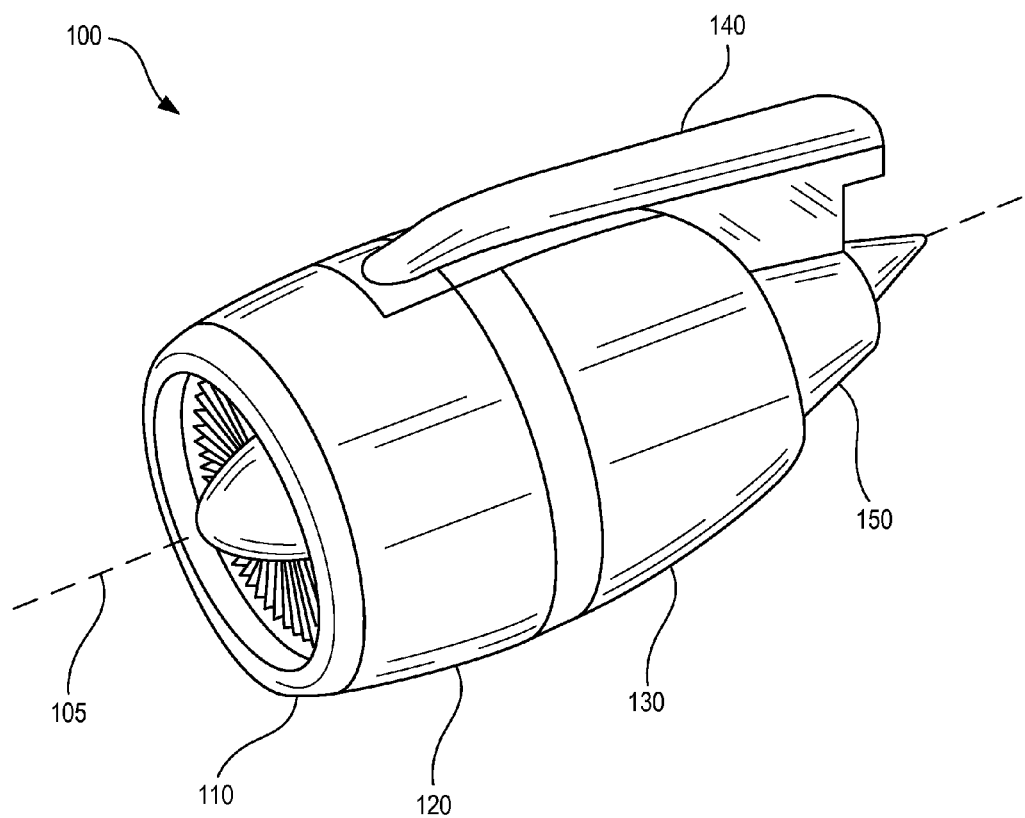
FIG. 1 illustrates a perspective view of a nacelle for an aircraft in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Nacelle 100 may further comprise an exhaust nozzle 150. The nacelle 100 may be disposed about a centerline 105, which may also be the axis of rotation of an engine located within the nacelle 100. Ice may build up on the inlet 110. An electric heater or a bleed air heater may heat the inlet 110 in order to prevent ice from forming or to melt ice present on the inlet 110.

Figure 2:
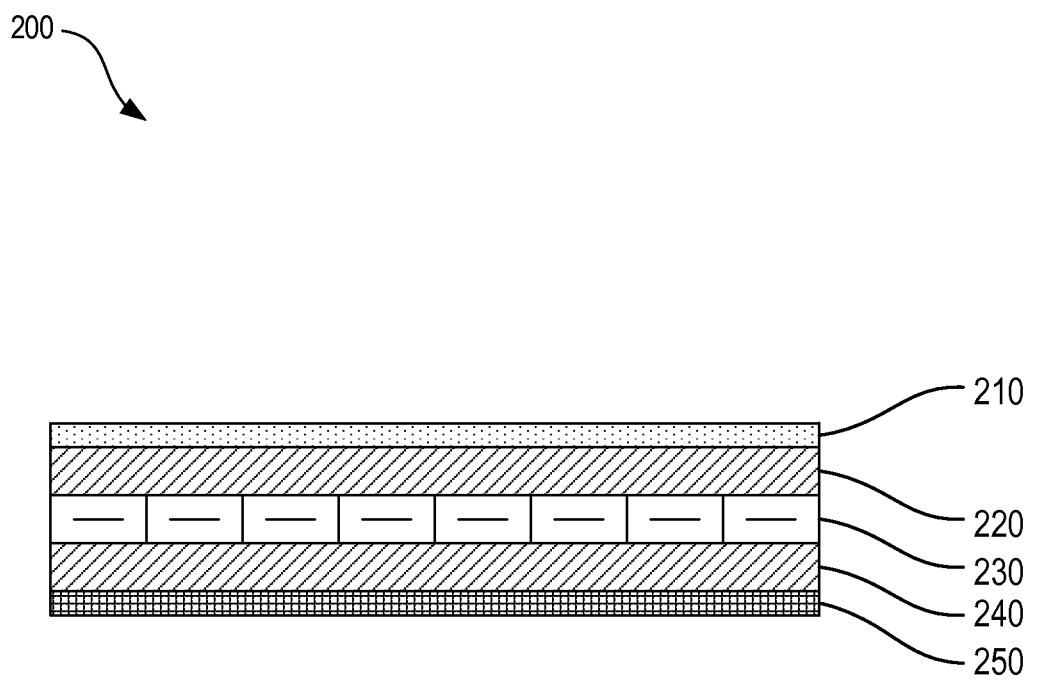
FIG. 2 illustrates a cross-section view of a composite lip skin with an electric heater in accordance with various embodiments.

Referring to FIG. 2, a cross-section of a composite lip skin 200 for an inlet with an electric heater is illustrated according to various embodiments. The composite lip skin 200 may comprise a surface coating 210, an outer composite skin or layer 220, an electric heater 230, an inner composite skin or layer 240, and a thermal barrier coating 250. The surface coating 210 may be an erosion resistant material. The surface coating 210 may be subject to impact from rain, hail, particulate matter, and lightning. In various embodiments, the surface coating 210 may comprise a polymer coating, an electroplated nickel, or a thin metallic skin.

The outer composite skin 220 and the inner composite skin 240 may comprise a plurality of plies of polyimide-based resin reinforced with a nonwoven or woven fiber fabric (carbon, glass, Kevlar or other suitable substances would be suitable depending on the application) further incorporating nanomaterials in a manner described below. The electric heater 230 may comprise a layer of graphite. Electricity may be applied to the graphite, and the resistance of the graphite may cause the graphite to generate heat. In various embodiments, the electric heater 230 may reach temperatures of 250° F. (120° C.) or higher. In various embodiments, the electric heater 230 may be co-cured within the outer composite skin 220 and the inner composite skin 240. It may be desirable for the surface coating 210 to reach 180° F. (80° C.) or higher to prevent ice build-up. The nanomaterials in the outer composite skin 220 and the inner composite skin 240 may increase the thermal conductivity of the outer composite skin 220 and the inner composite skin 240, and decrease cracking in the outer composite skin 220 and the inner composite skin 240. Thus, the electric heater 230 may be operated at lower temperatures or be positioned farther from the surface coating 210 while still heating the surface coating 210 to 180° F. (80° C.).

The thermal barrier coating 250 may discourage heat flux from the electric heater 230 towards the inner side of the inlet, and thus encourage heat flux from the electric heater 230 to the surface coating 210. In various embodiments, the thermal barrier coating 250 may comprise a glass fabric with a ceramic precursor, such as polycarbosilane. In various embodiments, the thermal barrier coating 250 may be a sprayed-on glass coating.

Figure 3:
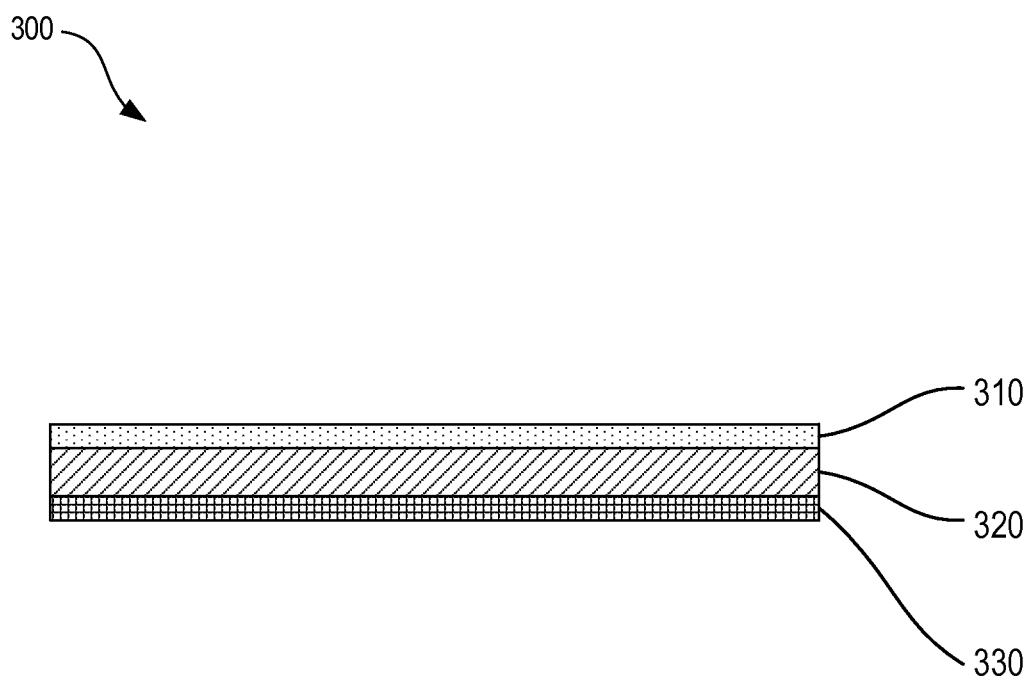
FIG. 3 illustrates a cross-section view of a composite lip skin for an inlet having pneumatic de-icing in accordance with various embodiments.

Referring to FIG. 3, a cross-section view of a composite lip skin 300 for an inlet comprising pneumatic deicing is illustrated according to various embodiments. The composite lip skin 300 may comprise a surface coating 310, a composite skin 320, and a thermal barrier coating 330. The surface coating 310 may be an erosion resistant material. The surface coating 310 may be subject to impact from rain, hail, particulate matter, and lightning. In various embodiments, the surface coating 310 may comprise a polymer coating, an electroplated nickel, or a thin metallic skin.

In various embodiments, the thermal barrier coating 330 may comprise a glass fabric with a ceramic precursor, such as polycarbosilane. In various embodiments, the thermal barrier coating 330 may be a sprayed on glass coating. Hot bleed air from an engine may be directed to the thermal barrier coating 330. Heat from the bleed air may transfer through the thermal barrier coating 330, through the composite skin 320, to the surface coating 310 to melt ice or prevent ice formation. In various embodiments, the bleed air may be hotter than desired to heat the surface coating 310 sufficiently. The thermal barrier coating 330 may insulate the composite skin 320 from the high temperature of the bleed air. Additionally, the thermal barrier coating 330 may distribute the heat from the bleed air evenly across the composite skin 320, which may prevent localized hot spots in the composite skin 320 which could damage the composite skin 320.

The composite skin 320 may comprise a polyimide composite skin reinforced with nanomaterials. The composite skin 320 may comprise a plurality of composite plies. It may be desirable for the surface coating 310 to reach 180° F. (80° C.) or higher to prevent ice build-up. The nanomaterials in the composite skin 320 may increase the thermal conductivity of the composite skin 320 and decrease cracking in the composite skin 320.

Figure 4:
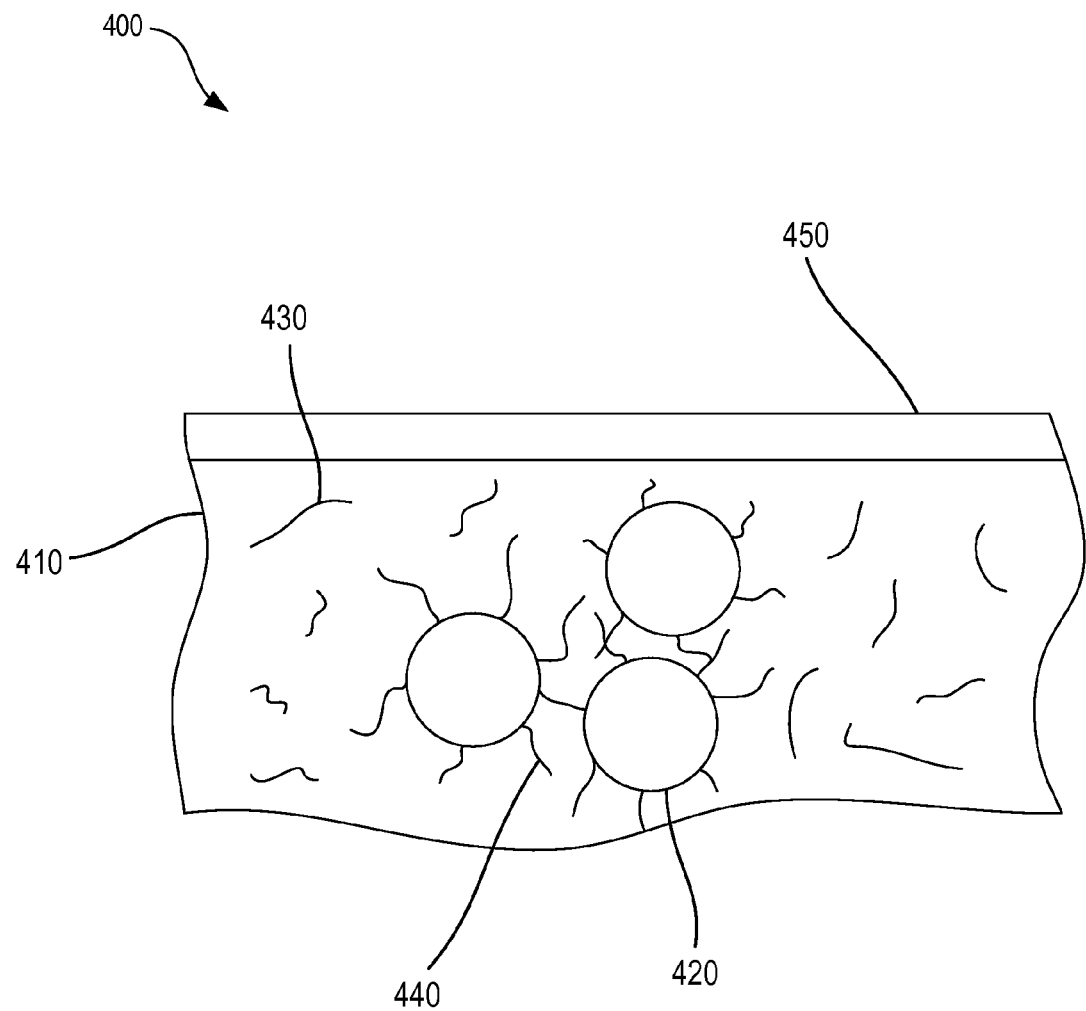
FIG. 4 illustrates an enlarged cross-section view of a composite ply in a composite skin in accordance with various embodiments.

Referring to FIG. 4, an enlarged cross-section view of a composite ply 400 in a composite skin is illustrated according to various embodiments. The composite ply 400 may comprise a polyimide resin matrix 410 and a plurality of fibers 420. In various embodiments, the fibers 420 may comprise carbon fibers. However, in various embodiments, the fibers 420 may comprise glass, aramid, polyethylene, boron, or silicon carbide.

The composite ply 400 may comprise nanomaterials 430, 440. In various embodiments, the nanomaterials 430, 440 may comprise at least one of carbon nanotubes, carbon nanofibers, or graphene nanoplatelets. In various embodiments, the nanomaterials 440 may be grown on the fibers 420. The polyimide resin matrix 410 may be added to the fibers 420 after the nanomaterials 440 are grown on the fibers.

However, in various embodiments, the nanomaterials 430 may be dispersed throughout the polyimide resin matrix 410. The nanomaterials 430 may be added to the polyimide resin matrix 410 via a variety of methods. For example, the nanomaterials 430 may be added to a polyimide resin, and the polyimide resin may be extruded into a polyimide film comprising the nanomaterials 430. The polyimide film may be resin film infused with the fibers 420. In various embodiments, the nanomaterials 430 may be mixed in a solvent, such as alcohol or acetone. The solvent may be added to a polyimide resin, and the mixture may be infused with the fibers 420. In various embodiments, both the grown-on nanomaterials 440 and the distributed nanomaterials 430 may be present in the composite ply 400.

In various embodiments, a nanoreinforced polyimide film 450 may be cured to the composite ply 400 as a surface film or between adjacent composite plies 400. The nanoreinforced polyimide film 450 may act as an oxygen barrier layer which prevents oxidation degradation of the polyimide resin matrix 410.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. An inlet for an aircraft nacelle comprising:
    a first polyimide composite skin comprising nanomaterials, the first polyimide composite skin comprising a first polyimide composite ply and a second polyimide composite ply;
    a second polyimide composite skin comprising nanomaterials, the second polyimide composite skin comprising a third polyimide composite ply and a fourth polyimide composite ply;
    an electric heater comprising a graphite layer positioned between the first polyimide composite skin and the second polyimide composite skin;
    a surface coating on the first polyimide composite skin, the surface coating comprising at least one of a polymer coating, an electroplated nickel, or a metallic skin; and
    a thermal barrier coating on the second polyimide composite skin, the thermal barrier coating comprising glass, wherein the thermal barrier coating is configured to reflect heat from the electric heater.

2. The inlet of claim 1, wherein the nanomaterials increase a thermal conductivity of the first polyimide composite skin.

3. The inlet of claim 1, wherein the nanomaterials are grown on carbon fibers in the first polyimide composite skin.

4. The inlet of claim 1, wherein the first polyimide composite skin comprises a nanoreinforced polyimide film.

5. The inlet of claim 1, wherein the nanomaterials are distributed in a polyimide resin matrix in the first polyimide composite skin.

6. A nacelle comprising a composite inlet, wherein the composite inlet comprises:
    a first polyimide composite skin comprising nanomaterials configured to increase a thermal conductivity of the first polyimide composite skin, the first polyimide composite skin comprising a first polyimide composite ply and a second polyimide composite ply;
    a second polyimide composite skin comprising nanomaterials, the second polyimide composite skin comprising a third polyimide composite ply and a fourth polyimide composite ply;
    an electric heater comprising a graphite layer positioned between the first polyimide composite skin and the second polyimide composite skin; and
    a surface coating coupled to the first polyimide composite skin, the surface coating comprising at least one of a polymer coating, an electroplated nickel, or a metallic skin; and
    a thermal barrier coating on the second polyimide composite skin, the thermal barrier coating comprising glass, wherein the thermal barrier coating is configured to reflect heat from the electric heater.

7. The nacelle of claim 6, wherein the nanomaterials are grown on carbon fibers in the polyimide composite skin.

8. The nacelle of claim 6, wherein the nanomaterials are dispersed in a polyimide resin matrix in the polyimide composite skin.

9. The nacelle of claim 6, wherein the nanomaterials lower a coefficient of thermal expansion of a polyimide resin matrix in the polyimide composite skin.

10. The nacelle of claim 6, further comprising a nanoreinforced polyimide film.

* * * * *